United States Patent [19]

Foerster et al.

[11] 4,276,559

[45] Jun. 30, 1981

[54] SYSTEM FOR GENERATING AN ERROR SIGNAL INDICATIVE OF DIFFERENCES BETWEEN RECORDING AND PLAYBACK SPEEDS

[75] Inventors: Hubert Foerster, Darmstadt; Winfried Horstmann, Griesheim; Josef Sochor, Darmstadt, all of Fed. Rep. of Germany

[73] Assignee: Robert Bosch GmbH, Stuttgart, Fed. Rep. of Germany

[21] Appl. No.: 20,729

[22] Filed: Mar. 15, 1979

[30] Foreign Application Priority Data

Mar. 25, 1978 [DE] Fed. Rep. of Germany ....... 2813206

[51] Int. Cl.³ .......................... H04N 5/76; H04N 5/78
[52] U.S. Cl. ........................................... 358/8; 360/36
[58] Field of Search ................... 358/8, 19; 360/36, 73

[56] References Cited

U.S. PATENT DOCUMENTS

| | | | |
|---|---|---|---|
| 3,461,226 | 8/1969 | Carnt | 358/8 |
| 3,474,190 | 10/1969 | Bruch | 358/8 |
| 3,679,814 | 7/1972 | Barclay | 358/8 |
| 3,681,518 | 8/1972 | Hidaka et al. | 358/4 X |
| 4,005,476 | 1/1977 | Dickopp et al. | 360/36 |
| 4,150,395 | 4/1979 | Pritchard | 360/36 |

Primary Examiner—Bernard Konick
Assistant Examiner—Aristotelis M. Psitos
Attorney, Agent, or Firm—Frishauf, Holtz, Goodman & Woodward

[57] ABSTRACT

Furnishing a signal having an amplitude corresponding to the difference between the recording and playback speed of a tape recorded color television signal, the phase of the color burst of two successive lines is compared. When the speed difference includes a known difference such as, for example, for slow motion reproduction, a compensating delay is added to the single line delay of the known apparatus and simultaneously a DC voltage corresponding to the so-added delay is added to the error signal derived from the phase comparator. The additional delay and the additional voltage for the error signal are automatically inserted into the circuit by ganging a switch or potentiometer for the additional delay and for the additional voltage to the speed control for the tape drive.

5 Claims, 3 Drawing Figures

SYSTEM FOR GENERATING AN ERROR SIGNAL INDICATIVE OF DIFFERENCES BETWEEN RECORDING AND PLAYBACK SPEEDS

CROSS-REFERENCE TO RELATED APPLICATIONS AND PUBLICATIONS (1) U.S. Pat. No. 3,428,745;
(2) German Patent Application No. P 2 642 019;
(3) U.S. Application Ser. No. 020,730, Josef Sochor, corresponding to German Patent Application Ser. No. P 28 13 207 of Mar. 25, 1978; filed simultaneously herewith.

The present invention relates to apparatus for generating an error signal indicative of the difference in playback and recording speeds of signals derived from a record carrier such as a magnetic tape. More particularly, it relates to systems wherein the signals recorded on the magnetic tape are color television signals.

Background and Prior Art

Apparatus for furnishing error signals corresponding to the difference between the recording and playback speed for color television signals derived from magnetic tapes are known and are disclosed, for example, in U.S. Pat. No. 3,428,745. In this patent a system is described wherein the color bursts in each line of the color television signal are delayed by one line period and the delayed and undelayed signals are applied to a phase comparator. A difference in phase between the color bursts from two sequential lines as thusly measured as indicative of the difference between the playback and recording speed. However the phase detectors which are normally used can only determine phase differences up to one period of the chrominance subcarrier. Thus, they cannot operate to generate uniquely defined values with magnetic tape recorders which allow still picture reproduction or slow motion or quick motion reproduction, wherein the difference between the playback speed and recording speed may cause the line period to change by more than this amount.

For television tape recorders operating with a helical scan, the transport speed of the magnetic tape is approximately 24 cm, while the relative speed between the scanning head and the tape which is determined mostly by the rotation of the drum is about 24 m. For a still picture reproduction, the transport speed of the tape is equal to zero and therefore the relative speed between the head and the tape is either 1% higher or lower than the normal or recording speed depending on the direction of rotation of the drum. If, for a quick motion reproduction, the transport speed of the tape is substantially increased relative to the normal speed, then the difference between the playback and recording speeds can be much greater, for example as much as 10% or even 30%. A system for such a slow motion or quick motion reproduction is described in German patent application No. P 2 642 019.

When the difference between the recording and playback speeds reaches such magnitudes, a uniquely defined phase difference can no longer be derived from the phase comparator.

The Invention: It is an object of the present invention to furnish an error signal indicative of the difference between the recording and playback speed which is uniquely determined even for speed differences which exceed those which could previously be measured.

Specifically, error signals indicative of the difference between recording and actual playback speeds under condition of quick motion reproduction, slow motion reproduction, and stop motion reproduction are to be provided.

For this purpose, delay means are provided which delay the playback signals by a total delay time equal to a first delay time corresponding to the time interval between two sequential color bursts at the recording speed and a second delay time corresponding to the difference between the selected playback speed and the recording speed. The so-created delayed signals are applied to one input of a phase comparator, the second input of which receives the playback signals as derived from the tape. The phase comparator therefore furnishes a first error signal which corresponds to the deviation of the actual playback speed from the selected playback speed. Since the error signal is also to have a component corresponding to the difference between the selected speed and the recording speed, a DC voltage is also furnished which corresponds to the particular selected playback speed or more specifically, the difference between the selected playback speed and the recording speed. A summing circuit then adds the reference signal to the first error signal and thereby furnishes a final error signal which corresponds to the total difference in speed during recording and playback.

DRAWINGS ILLUSTRATING PREFERRED EMBODIMENTS

Figure 1:
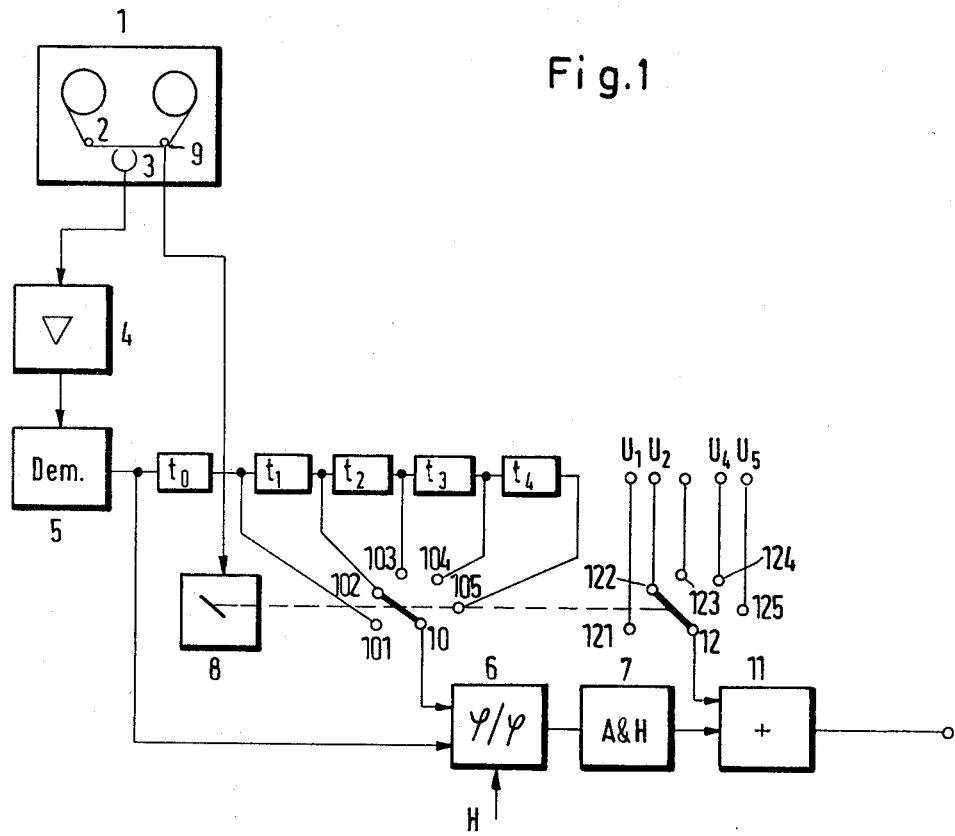
FIG. 1 is a schematic diagram of an embodiment of the invention utilizing stepwise delay circuits.
Figure 2:
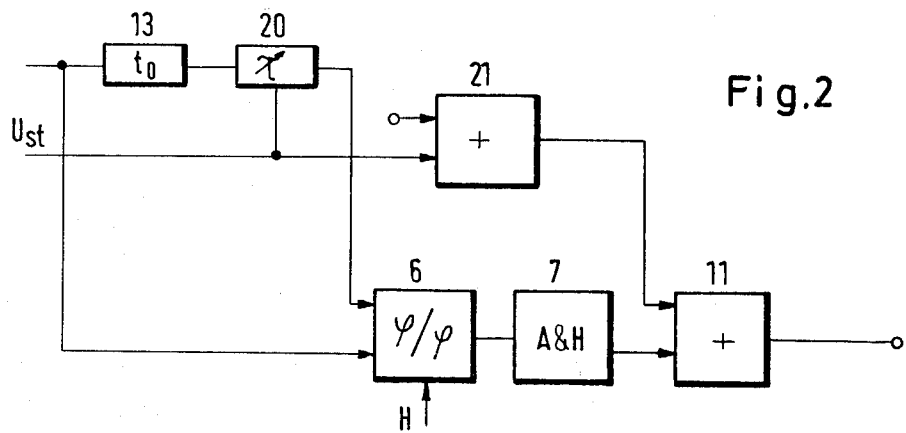
FIG. 2 is a schematic diagram of an embodiment utilizing a continuously variable delay.
Figure 3:
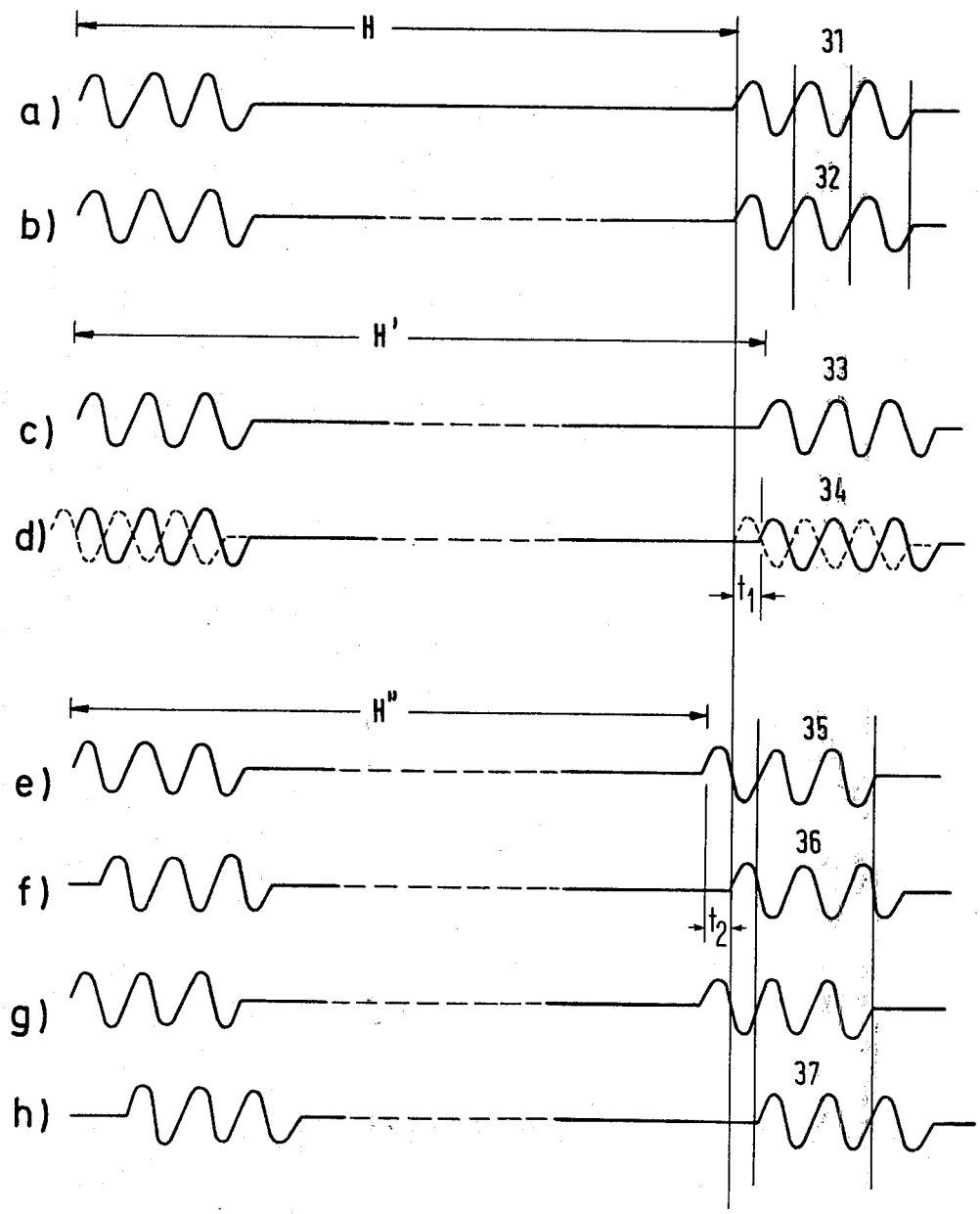

and FIG. 3 shows the variation with respect to time at various points in the circuits of FIGS. 1 and 2.

In FIG. 1, reference numeral 1 denotes a magnetic tape recorder whose tape 2 is transported past a magnetic head 3. For tape recorders recording television signals, a number of methods are known for increasing the relative speed between the head and the tape. For example, a helical scan system and a transversal track recording system are often used. Both of these systems include a drum at whose periphery are arranged either one or a plurality of heads. For simplicity, only one head, namely head 3 has been pictured. The output signals from head 3 are amplified in a preamplifier 4 and demodulated in a demodulator 5. The color bursts are delayed for a delay time, $t_o$, in a delay unit 13. Since, for known color television systems having quadrature modulated subcarriers, the number of chrominance subcarrier oscillations per line is not integral, the first delay time $t_o$ of FIG. 2 differs from the line interval time by plus or minus 90° or plus or minus 180° of the chrominance subcarrier period depending upon the type of television signal and type of phase comparator used. In the embodiment shown in FIG. 1, the time delay $t_o$ is less than one line period and the total delay required when the tape is driven at normal speed includes time delay $t_1$ and $t_2$. Time delay $t_1$ and $t_2$ correspond to changes in a line period resulting from a stepwise switching of the tape transport speed. The latter is accomplished by a switching in tape speed control unit 8 which controls the speed of capstan 9. If now tape speed control unit 8 is operated to cause tape 2 to be driven at the recording speed, then a delay selector switch 10 having selector positions 101, 102, 103, 104 and 105 is in position 103. Phase comparator circuit 6 then operates in known fashion to furnish a first error signal which results from the statistical deviations of the tape transport speed from the desired or recording speed. A sample-and-hold circuit 7 connected to the output of phase comparator 6 transforms the intermittent first error signal at the output of phase comparator 6 into a continuous signal which remains constant during each line period.

A summing circuit 11 is connected to the output of sample-and-hold circuit 7. Summing circuit 11 has a second input which is connected to the arm of a selector switch 12. Selector switch 12 is also coupled to tape speed control unit 8. It is switched in unison with tape speed control unit 8 to one of a plurality of selector switch positions, namely positions 120-125. A reference voltage $U_1-U_5$ is applied to the second input of summing circuit 11 in positions 120-125, respectively. Therefore when the tape is driven at the recording speed, selector switch 12 is in position 123 where no reference voltage is applied to the second input of summing circuit 11. The final error signal appearing at the output of summing circuit 11 is thus equal to the first error signal at the output of sample-and-hold unit 7 when the tape is driven at the recording speed. This final error signal can be applied to a phase compensation circuit which consists in the main of a controllable delay line. It can also be utilized to control the amplitude of the playback signals as is discussed in U.S. Patent Application Ser. No. 20,730 filed simultaneously herewith.

Let is now be assumed that tape speed control unit sets a tape transport speed which differs from the recording speed. Under these circumstances the delay time is either increased by adding units 16 and 17 or is decreased by subtracting the delay time furnished in units 15 and 14. Thus, even if the recording speed differs from the playback speed by a relatively large amount such as 1 or more per cent, the phase comparator circuit can still work within its nominal range. Since, however, the final error signal is to correspond to the total speed difference between the recording speed and the playback speed, a DC voltage $U_1$, $U_2$, $U_4$ or $U_5$ is added to the first error signal in summing circuit 11. The sign of voltages $U_1$ and $U_2$ differs from that of voltages $U_4$ and $U_5$ since both an increase and a decrease in the speed differences must be accommodated.

This will be explained in greater detail with reference to FIG. 3. FIG. 3 shows voltage-time diagrams of color bursts which are applied to phase comparator circuit 6. Lines a, c and e show undelayed playback signals with different periods (H, H', H") while lines b, d, f, g and h show the corresponding delayed signals. The delay is always so chosen that the phase comparator circuit operates in the middle of the operating region for each selected transport speed and thus allows sufficient room to accommodate statistical deviations in both directions.

Line a illustrates color burst signals derived from color television signals having a line period H when the playback speed is equal to the recording speed. The same signals delayed by a period H are shown in line b. The color burst illustrated on the lefthand side of line a reappears in line b after a time delay of one line which is indicated by an arrow. For the illustration in FIG. 3 the fact is disregarded that the phase of the color burst signals changes from line to line and that therefore an additional delay must be provided. This additional delay is not shown. Phase comparator 6 compares the series of oscillations 32 and 31 to each other. If now the tape transport speed is changed so that the relative speed between the tape and the magnetic heads or head is decreased, the signals are stretched. As shown in line c the playback signals then have a longer line period, for example H'. As was discussed in detail with reference to FIGS. 1 and 2, the delay between the two signals is then correspondingly increased so that the color bursts 33 and 34 to be compared again are sufficiently coincident to allow phase comparator 6 to operate within its range. The position which color burst 34 would have if only the delay H were provided as is done in known systems is shown by the dotted line.

Line e shows color bursts which appear at a lesser time period H" because of an increased relative speed between the tape transport and the head. If the delay time were not changed from the delay time shown in line a and b, then phase comparator circuit would have to compare the phases of color bursts 35 and 36 (lines e and f respectively) to each other. Since in this case the phase deviation is 180°, a very complicated phase comparator circuit would be required. If, however, the delay is matched to the relative speed as is shown in line g, a very simple phase comparator circuit may be used.

Since delay lines are commercially available only for particular delay times and since the manufacture of special delay lines greatly increases the cost of the system, it is possible to dispense with decreases in the delay time and increase the delay time even for higher relative speeds, that is for shortened line periods. This is illustrated in line h. It will be noted that the pulse train 37 no longer coincides in time with pulse train 35 but is delayed by the time required for one chrominance subcarrier oscillation. This does not affect the phase comparison adversely. Although it is desirable to carry out the phase comparison on the basis of a relatively large number of oscillations in order to eliminate the effect of noise, the fact that the two signals to be compared are not coincident for one or two oscillations is of no importance since each color burst contains ten oscillations. It should be noted that to keep the diagram simple only three of the oscillations in each color burst are shown in the figure.

It is thus possible and within the scope of the present invention that switch 10 of FIG. 1 will be in position 101 when the tape is being driven at the recording speed and that the delay is then increased whenever the playback speed is purposely changed relative to the recording speed.

A second embodiment of the invention is shown in FIG. 2. While the delay units and the reference voltages were changed in a stepwise manner in FIG. 1, the same variations are carred out in a continuous fashion in the embodiment shown in FIG. 2. In this case of course tape speed control unit 8 also operates to vary the speed of the capstan continuously. A voltage $U_{st}$ is generated in tape speed control unit 8 and has an amplitude which corresponds to the tape transport speed. Voltage $U_{st}$ is applied to a delay line 20 whose delay varies continuously as a function of the so-applied voltage. Delay unit 20 replaces delay units 14–17 of FIG. 1. In the same way selector switch 12 is replaced by an adder circuit 21 which causes voltage $U_{st}$ to be decreased by a constant amount. The output of adder circuit 21 is applied to the second input of summing circuit 11. The remaining elements shown in FIG. 2 are the same as those shown in FIG. 1 and serve the same purpose. They will thus not be described in detail again.

Various changes and modifications may be made within the scope of the inventive concepts.

A suitable phase comparator is described in U.S. Pat. No. 3,636,252 (Kowal) and includes a forward-backward counter 34 and a ramp generator 36 used with a sample-and-hold circuit 38. Alternatively, U.S. Pat. No. 3,621,353 (Matley) shows a phase detector 11 and a sample-and-hold circuit 15 in detail in FIG. 2. These elements constitute part of a speed control unit suitable for use in the present invention.

Various changes and modifications may be made within the scope of the inventive concepts.

We claim:

1. In a color television signal recording system having record carrier means (2) having a color television signal including periodically recurring color bursts recorded thereon at a recording speed, means (3) for scanning said record carrier means and furnishing playback signals corresponding to said recorded color bursts, transport means (9) for moving said record carrier means relative to said scanning means at an actual playback speed approximately equal to a selected one of a plurality of selectable playback speeds and phase comparator means (6) having a first and second input for comparing the phase of signals applied to said inputs and furnishing a first error signal indicative of the phase difference therebetween, apparatus for furnishing a final error signal indicative of the difference between said recording speed and the then present actual playback speed, comprising delay means comprising a plurality of selectable delay segments selectively providing at least a first delay time $(t_o + t_1 + t_2)$ corresponding to the time interval between two sequential ones of said bursts at said recording speed and at least another selected delay time which corresponds to the difference between said selected playback speed and said recording speed, thereby creating delay signals;

means for applying said delayed signals and said playback signals to said first and second input of said phase comparator means, respectively whereby said phase comparator means furnishes a first error signal indicative of the difference between said actual playback speed and said selected playback speed;

means for furnishing a DC voltage corresponding to said selected one of said plurality of playback speeds; and means (11) connected to said DC voltage furnishing means and said phase comparator means for combining said first error signal and said DC voltage so as to furnish said final error signal corresponding to said difference between said recording speed and said actual playback speed.

2. A system as set forth in claim 1, wherein said transport means comprises speed selector switch means (8) for selecting said selectable playback speed;

wherein said delay means comprises a plurality of delay units, and delay selector switch means (10) interconnected between said plurality of delay units and said phase comparator means;

wherein said means for furnishing a DC voltage comprises means for furnishing a plurality of DC voltages each having an amplitude different from the others of said DC voltages, and reference selector switch means (12) interconnected between said means for furnishing a plurality of DC voltages and said summing circuit means for applying a selected one of said plurality of DC voltages to said summing circuit means;

further comprising means for coupling said delay selector switch means and said reference signal selector switch means to said speed selector switch means for joint operation therewith.

3. A system as set forth in cliam 1, wherein said delay means comprises means for furnishing a control signal controlling said speed of said record carrier means relative to said scanning means, and means (20) connected to said means for furnishing a control signal for furnishing a delay time varying in dependence upon said control signal;

and wherein said control signal constitutes said DC voltge.

4. A system as set forth in claim 3, further comprising means for furnishing a constant voltage, and means (21) for adding said constant voltage to said control signal to constitute said DC voltage.

5. A system as set forth in claim 1, wherein said combining means comprises a summing circuit;

further comprising sample-and-hold circuit means interconnected between said phase comparator means and said summing circuit.

* * * * *